(12) United States Patent
Pennington, Jr. et al.

(10) Patent No.: US 10,754,380 B2
(45) Date of Patent: Aug. 25, 2020

(54) WEARABLE COMPUTING DEVICE MOUNTS WITH STANCHIONS

(71) Applicant: HEWLETT-PACKARD DEVELOPMENT COMPANY, L.P., Houston, TX (US)

(72) Inventors: John William Pennington, Jr., Mountain View, CA (US); Fu-Yi Chen, Taipei (TW); ShuChun Hsiao, Taipei (TW); Daniel Young Yoon, Santa Clara, CA (US); Insun Hong, Taipei (TW); Will Macia, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/051,032

(22) Filed: Jul. 31, 2018

(65) Prior Publication Data

US 2019/0041901 A1    Feb. 7, 2019

Related U.S. Application Data

(63) Continuation-in-part of application No. 29/612,524, filed on Aug. 1, 2017, now Pat. No. Des. 832,837, and
(Continued)

(51) Int. Cl.
*G06F 1/16* (2006.01)

(52) U.S. Cl.
CPC ............ *G06F 1/163* (2013.01); *G06F 1/1628* (2013.01); *G06F 1/1632* (2013.01)

(58) Field of Classification Search
CPC ...... G06F 1/163; G06F 1/1628; G06F 1/1666; G06F 1/1632; A45F 3/04;
(Continued)

(56) References Cited

U.S. PATENT DOCUMENTS

D351,133 S     10/1994  Jungels-Butler
5,774,338 A *   6/1998  Wessling, III ..... A41D 13/0012
                                                                2/94
(Continued)

FOREIGN PATENT DOCUMENTS

CN       201079120 Y     7/2008
CN       201365632 Y    12/2009
(Continued)

OTHER PUBLICATIONS

Kastranakes; "HP Fixed the Biggest Problem With its VR Backpack PC and Will Sell it Next Month"; Jun. 6, 2017; 5 pages; https://www.theverge.com/circuitbreaker/2017/6/6/15744586/hp-omen-x-compact-desktop-virtual-reality-backpack-pc.
(Continued)

*Primary Examiner* — Abhishek M Rathod
(74) *Attorney, Agent, or Firm* — HP Inc. Patent Department

(57) ABSTRACT

A wearable computing device mount may include a harness wearable by a user; a plate attached to the harness, wherein a computing device is selectively mounted to the plate via mechanical fasteners, the plate including a plurality of stanchions to separate a back side of the plate from the harness; and a docking station, the docking station to communicatively couple to the computing device.

19 Claims, 11 Drawing Sheets

Related U.S. Application Data a continuation-in-part of application No. 29/612,525, filed on Aug. 1, 2017, now Pat. No. Des. 831,276, and a continuation-in-part of application No. 29/612,534, filed on Aug. 1, 2017, now Pat. No. Des. 852,423.

(58) Field of Classification Search
CPC .. A45F 2200/0525; A45F 3/047; A45C 15/00; A45C 2011/003; A45C 2013/025
See application file for complete search history.

(56) References Cited

U.S. PATENT DOCUMENTS

| | | | |
|---|---|---|---|
| D455,746 S | 4/2002 | Ronzani | |
| 6,529,372 B1 | 3/2003 | Ng | |
| 6,843,012 B1 | 1/2005 | Dodd | |
| D528,657 S | 9/2006 | Adams | |
| 7,265,970 B2 | 9/2007 | Jordan | |
| D613,497 S | 4/2010 | Pho | |
| D640,699 S | 6/2011 | McParland | |
| 8,104,653 B1 | 1/2012 | Leung | |
| D667,403 S | 9/2012 | Maus | |
| D683,952 S | 6/2013 | Bettauer | |
| D685,323 S | 7/2013 | Szymanski | |
| 8,896,992 B2 | 11/2014 | Sherlock | |
| D732,241 S | 6/2015 | Couzyn | |
| 9,545,146 B1* | 1/2017 | King | H04N 1/00901 |
| 9,690,327 B2* | 6/2017 | Kielland | A45F 3/02 |
| 10,007,303 B1* | 6/2018 | Wang | A45F 5/00 |
| 2003/0041206 A1* | 2/2003 | Dickie | G06F 1/1616 |
| | | | 710/303 |
| 2003/0231166 A1 | 12/2003 | Langlois | |
| 2006/0113203 A1 | 6/2006 | Daley | |
| 2008/0043416 A1 | 2/2008 | Narayan | |
| 2009/0078707 A1* | 3/2009 | Chen | A45F 5/00 |
| | | | 220/592.01 |
| 2009/0213536 A1* | 8/2009 | Lewandowski | G06F 1/1632 |
| | | | 361/679.43 |
| 2009/0284908 A1 | 11/2009 | Daley, III | |
| 2010/0032464 A1* | 2/2010 | Gleason, Jr. | A45F 3/08 |
| | | | 224/631 |
| 2012/0293935 A1* | 11/2012 | Sherlock | G06F 1/163 |
| | | | 361/679.03 |
| 2013/0194729 A1 | 8/2013 | Joe | |
| 2015/0208790 A1* | 7/2015 | Pylkovas | A45F 3/02 |
| | | | 224/578 |
| 2016/0062417 A1* | 3/2016 | Chu | G06F 1/1698 |
| | | | 600/390 |
| 2016/0320795 A1* | 11/2016 | Daley, III | G06F 1/1616 |
| 2018/0120897 A1* | 5/2018 | Smit | A45C 5/02 |
| 2018/0210491 A1* | 7/2018 | Song | G04G 17/06 |

FOREIGN PATENT DOCUMENTS

| | | |
|---|---|---|
| CN | 204994845 U | 1/2016 |
| CN | 107515468 A | 12/2017 |
| CN | 207055138 U | 3/2018 |

OTHER PUBLICATIONS

VR Go Backpack PC; Nov. 2016; Zotac.
VR One 7RE; Feb. 18, 2017; MSI.

* cited by examiner

WEARABLE COMPUTING DEVICE MOUNTS WITH STANCHIONS

BACKGROUND

Enhanced reality systems allow a user to become immersed in an enhanced reality environment wherein they can interact with the enhanced environment. Enhanced reality systems include augmented reality, virtual reality, and mixed reality systems that involve users interacting with real and/or perceived aspects of an environment in order to manipulate and/or interact with that environment. In the example of a virtual reality system, a head-mounted display (HMD), using stereoscopic display devices, allows a user to see and become immersed in any virtual scene.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
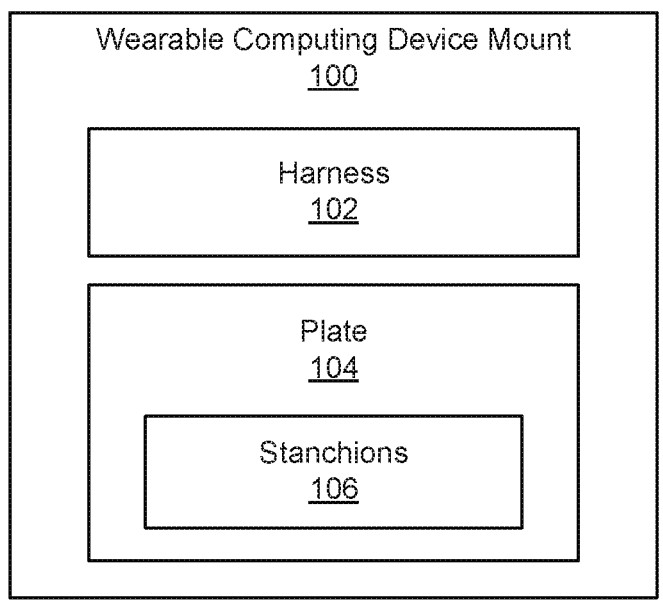
FIG. 1 is a block diagram of a wearable computing device mount, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Enhanced reality systems allow a user to become immersed in an enhanced reality environment wherein the user may interact with an enhanced environment. In some examples, user input devices are incorporated into an enhanced reality system. For example, handles that have various gyroscopes, accelerometers, and buttons, detect user movement and other user input and manipulate the enhanced environment accordingly. As such, users can use input devices to interact with the enhanced scene. As one particular example, hand trackers in the handles allow a user to grab objects in the enhanced scene.

Enhanced reality systems include virtual reality (VR) systems, augmented reality (AR) systems, and mixed reality (MR) systems. Such enhanced reality systems can include enhanced reality headsets to generate realistic images, sounds, and other human discernable sensations that simulate a user's physical presence in a virtual environment presented at the headset. A VR system includes physical spaces and/or multi-projected environments. AR systems may include those systems and devices that implement live direct and/or indirect displays of a physical, real-world environment whose elements are augmented by computer-generated sensory input such as sound, video, graphics and/or GPS data. MR systems merge real and virtual worlds to produce new environments and visualizations where physical and digital objects co-exist and interact in real time. For simplicity, VR systems, AR systems, and MR systems are referred to herein as enhanced reality systems.

While such enhanced reality systems have undoubtedly provided a valuable tool in many industries as well as a source of recreation for users, some characteristics impede their more complete implementation. For example, large amounts of data are transferred between 1) a computing device that generates the enhanced reality scene and 2) the auxiliary components, such as enhanced reality headsets and enhanced reality controllers, which allow interaction with the scene. To enhance information exchange, this data can be transferred via a physical cable tethered between the enhanced reality auxiliary components and the computing device. When one end of a physical cable is coupled to an immobile computing device such as a desktop, the user is limited in their movement by the dimensions of the cable, i.e., length of the physical cable.

The present specification describes a wearable mount that allows a computing device to be moved with the user, thus avoiding the limitations imposed by a length of physical cable tied to, for example, a desktop fixed computing device. More specifically, the present specification describes a mount to which the computing device is selectively attached. The mount can then be worn by a user, on the back while freely walking about. To operate, the auxiliary components may be electrically coupled to the computing device. However, rather than being directly coupled to the computing device, the mount, in an example, may include a docking station to which the auxiliary components are connected. Upon insertion of the computing device into the docking station of the mount, an electrical connection is established between the computing device and the docking station. The connection works in combination with connections between the auxiliary components and the docking station, allowing the docking station to serve as a bridge between the computing device and the auxiliary components. In other words, rather than attaching the computing device to the wearable mount and then individually attaching each auxiliary component to the computing device, which can be time-consuming, inefficient, and burdensome; the auxiliary components may be coupled to the docking station with the computing device being swappable or selectively coupled to the docking station.

Such a mount simplifies use of an enhanced reality system. Specifically, to be fully immersed in an enhanced environment, a user should be able to move around unrestricted. The wearable mount on which the computing device is placed facilitates such unimpeded movement. Moreover, the mount facilitates a truly mobile computing device by allowing selective removal of the computing device such that it can be relocated between the wearable mount and another docking port, the second docking port being already connected to a different variety of auxiliary components. For example, some auxiliary components associated with a desktop, e.g., a mouse, a keyboard, and/or a monitor, may be better suited for some workflows such as content creator workflows. By comparison, the accessories associated with consuming content within an enhanced environment are different, e.g., a head-mounted display and motion controllers. The docking station allows for a rapid transition between these two sets of accessories, thereby reducing the time between content creation and content viewing.

However, despite the convenience of the mount described herein, the computing device may be placed against the user's back. Because of the relatively higher number of processes executed by the computing device in connection with an enhanced reality application, the computing device may produce an amount of heat. This heat may be transferred through the mount and harness described herein to the user. This additional heat may make the user uncomfortable. The wearable computing device mount includes a plurality of stanchions that separates a harness of the mount from a plate of the mount such that a space is formed between the computing device and a user's back. The flow of air between the user's back and the computing device may allow a user's back to be relatively cooler while the heat from the computing device is dissipated away from the user. In addition to the space formed by the stanchions a number of air ducts or vents may be formed on the computing device and/or the plate of the mount so as to direct the hot air from the computing device away from the user.

Additionally, the docking station of the mount further enhances the mobility of the computing device as each auxiliary component, of which there may be many, are not attached directly to the computing device each time the computing device is coupled to the mount. Accordingly, the electrical connections of the computing device may be at a single point or at multiple points, i.e., between the docking station of the mount and the computing device itself.

The present specification describes a wearable computing device mount. The wearable computing device mount includes a harness wearable by a user and a plate attached to the harness. A computing device is selectively mounted to the plate via mechanical fasteners. In any example, the wearable computing device mount also includes a docking station attached to the plate. The docking station may be communicatively coupled to the computing device. In any example presented herein, the docking station may include 1) a computing device port to engage with an electrical connector of the computing device when mounted to the plate and 2) an auxiliary port to receive an auxiliary component. In any example presented herein, the docking station may be electrically coupled to the computing device with the auxiliary component.

The present specification also describes a wearable computing system. In any example presented herein, the wearable computing system may include a computing device and a wearable computing device mount. The wearable computing device mount, in any example presented herein, may include a harness wearable by a user and a plate attached to the harness. In any example presented herein, the harness may include a head-mounted display (HMD) strap to secure a head-mounted display to the harness. In an example, the computing device may be selectively mounted to the plate via mechanical fasteners. The wearable computing device mount may also include a docking station attached to the plate. The docking station may include a computing device port to engage with an electrical connector of the computing device when mounted to the plate. The docking station electrically couples the computing device with the auxiliary component.

The present specification also describes a wearable enhanced reality system. The system may include an enhanced reality computing device which generates an enhanced reality environment. The wearable enhanced reality system may include a wearable computing device mount that includes a harness wearable by a user and a plate attached to the harness. The enhanced reality computing device may be selectively mounted to the plate via mechanical fasteners. In any example presented herein, the wearable computing device mount may include a docking station attached to the plate. In any example presented herein, the docking station may include 1) a computing device port to engage with an electrical connector of the computing device when mounted to the plate and establish an electrical connection with the enhanced reality computing device upon mounting to the plate and 2) multiple auxiliary ports, each to receive one of multiple auxiliary components. The system may include multiple auxiliary components comprising at least 1) a head-mounted enhanced reality display and 2) a computing device power supply. In any example presented herein, the harness may include a strap to selectively hold a head-mounted display (HMD) to the harness. In any example presented herein, the plate may include a plurality of shoulder stanchions and a plurality of hip stanchions to separate the plate from the harness. In any example presented herein, the wearable computing device mount may include a battery pack retainer to receive a battery pack and electrically couple the battery pack to the computing device.

Use of the wearable computing device mount described herein 1) improves immersion in the enhanced environment by allowing unimpeded movement of a user while interacting with the enhanced environment, 2) enhances the efficiency of use of an enhanced reality system by reducing the time between content creation and content viewing; 3) simplifies the setup for the enhanced reality system; and 4) provides a comfortable atmosphere for a user by reducing the heat felt by a user from the computing device while wearing the mount. However, it is contemplated that the devices disclosed herein may address other matters and deficiencies in a number of technical areas.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described but may or may not be included in other examples.

FIG. 1 is a block diagram of a wearable computing device mount (100), according to an example of the principles described herein. The wearable computing device mount (100) is to receive a computing device, which may be of a variety of types. For example, the computing device may be an enhanced reality computing device that, upon execution of computer readable program code by a process, generates an enhanced environment such as a virtual environment, a mixed environment, and/or an augmented environment. As described herein, different auxiliary components may be communicatively coupled to the computing device to immerse a user in the enhanced environment. Specific examples of auxiliary components include an enhanced reality display device in the form of wearable goggles often called a head-mounted display (HMD), an enhanced reality auditory device, and enhanced reality controllers. These auxiliary components may all be coupled to the computing device to create, and allow interaction with, the enhanced environment.

The wearable computing device mount (100) includes a harness (102) wearable by a user. For example, the harness (102) may include shoulder straps to be worn by a user. The harness (102) may be such that, when worn by a user, the computing device is disposed on a back of the user.

The wearable computing device mount (100) also includes a plate (104) that is attached to the harness (100). The plate (104) may be a rigid piece of material, such as plastic or metal, to which the computing device is attached. For example, the plate (104) may include a number of mechanical fasteners that interface with elements of the computing device to affix the two together. As a specific example, the mechanical fasteners of the plate (104) may be protrusions with hooks that interface with slots on the computing device. The mechanical fasteners may allow a user to quickly engage or disengage the computing device with the plate (104). In an example, a user may access a button or switch that causes the mechanical fasteners to be selectively coupled or decoupled to the computing device. In any example presented herein, a surface of the plate (104) that interfaces with a computing device may be flat or substantially flat so as to receive the computing device. This may provide a rigid surface onto which the user may secure the computing device thereto.

In any example presented herein, the plate (104) includes a plurality of stanchions (106) that cause the plate (104) to be separated or raised away from a back side of the harness (102) and, when the harness (102) is worn by a user, separated by a distance from the back of a user. In an example, the stanchions (106) may include a first and second shoulder stanchion that are coupled to a shoulder portion of the harness (102) and a first and second hip stanchion that are coupled to a hip portion of the harness (102). It is at these portions of the harness, the shoulder and hip portions, where the plate comes in contact with the harness and, in turn places weight of the plate (104) and, in an example, a docking station on the user. The stanchions (106) may be coupled to the harness (102) via a number of fasteners in order to secure the plate (104) to the harness (102). By placing the stanchions (106) on the shoulders and hips of the harness (102) the weight of the wearable computing device mount (100) may be distributed to the user's body. Specifically, the weight of the wearable computing device mount (100) may be placed on those locations of the user's body where weight is relatively more bearable and comfortable: the user's shoulders and hips. This may render the wearable computing device mount (100) more comfortable to the user and increase the usability of the mount (100).

The wearable computing device mount (100) also includes a docking station. The docking station electrically couples the computing device to various auxiliary components. The docking station may be passive, meaning it does not include processors or other data-processing components. In this example, the docking station is a conduit for electrical signals and other data between the auxiliary components and the computing device. In another example, the docking station is active, meaning it has processors and/or other signal-processing components to manipulate the data and other signals passing between the computing device and auxiliary components.

In an example, the docking station may include a computing device port that receives a computing device. Specifically, the computing device port may include electrical components that engage with an electrical connector of the computing device upon mounting to the plate (104). Accordingly, an electrical connection between the docking station and computing device is achieved once the computing device is seated against the plate (104) and no additional operations are performed to establish an electrical connection.

The docking station may also include an auxiliary port. The auxiliary port may couple an auxiliary component to the computing device. For example, the docking station may include a USB port to receive a connector for an enhanced reality controller. In this fashion, rather than connecting the enhanced reality controller to the computing device itself, it is connected to the docking station, thus allowing the computing device to be removed from, and attached to, the plate (104) without having to attach and detach the auxiliary components each time. In other words, the docking station of the mount (100) allows a user to leave the auxiliary components, such as batteries and enhanced reality headsets, plugged into the mount (100) while the computing device is removed and attached. Doing so increases the technical ability of the system by providing an enhanced reality system that 1) is wearable and 2) provides for electrical connections through a wearable docking station as opposed to through the computing device directly.

Figure 2:
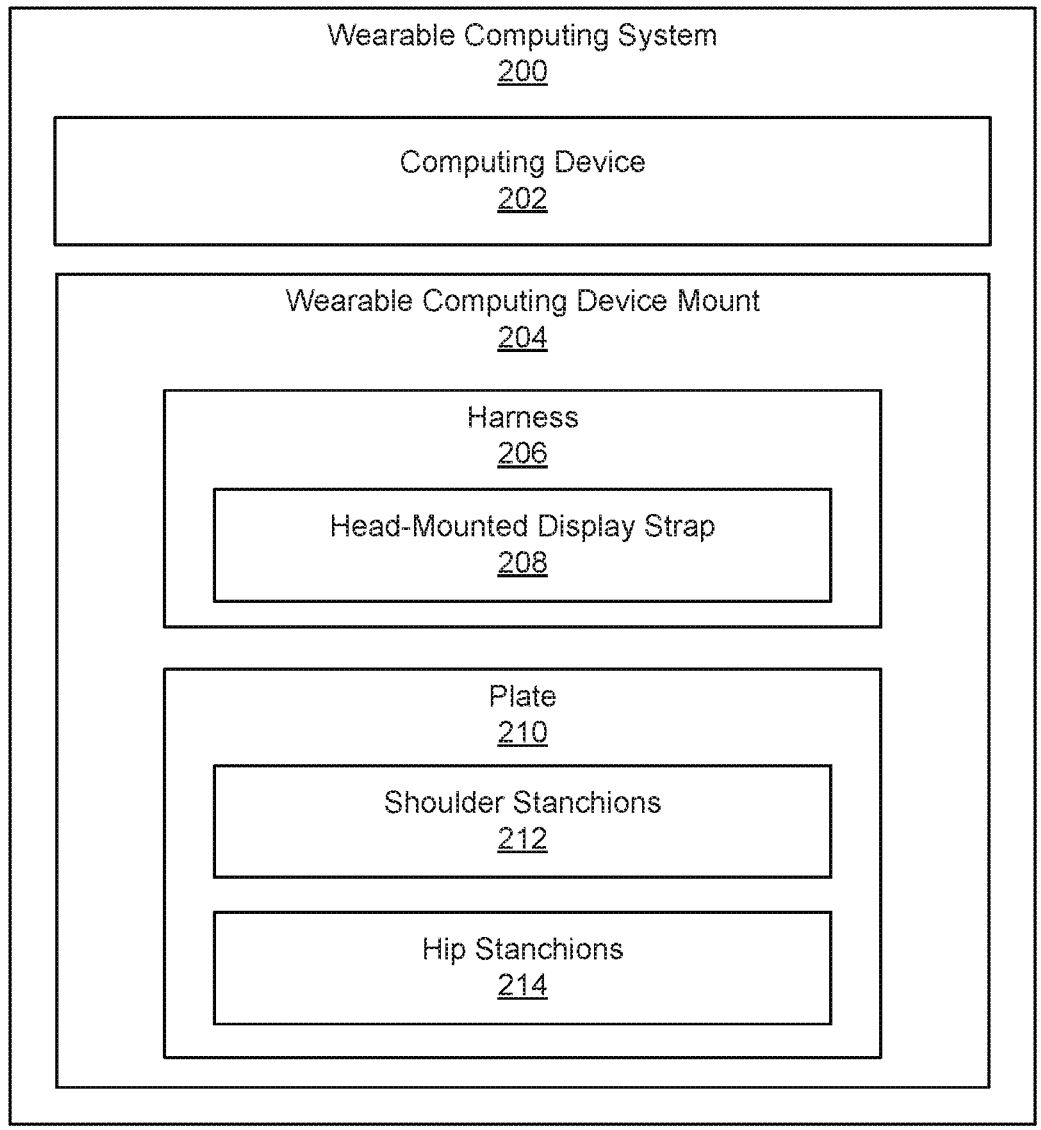
FIG. 2 is a block diagram of a wearable computing device according to an example of the principles described herein.

FIG. 2 is a block diagram of a wearable computing system (200) according to an example of the principles described herein. The wearable computing system (200) may include a computing device (202) and a wearable computing device mount (204). As described herein, the computing device (202) may be selectively coupled to the wearable computing device mount (204). In an example, the computing device (202) is selectively coupled to the wearable computing device mount (204) via a latch that may be activated by a user to remove the computing device (202) from the wearable computing device mount (204). This may allow a user or multiple users to use the wearable computing device mount (204) described herein by swapping out different computing devices (202) used and/or owned by a plurality of users. Indeed, in implementing the wearable computing system (200) a user may implement the wearable computing device mount (204), engage in the augmented reality presented by the computing device (202), remove the computing device (202) from the wearable computing device mount (204), and allow a second user to attach a second computing device (202) to the wearable computing device mount (204) and engage in another augmented reality experience presented by the second computing device (202).

The wearable computing device mount (204) of the wearable computing system (200) may include a harness (206), a plate (210), and, in an example, a docking station. Although the present specification describes the wearable computing device mount (204) as including a docking station, the present specification contemplates that the computing device (202) be selectively mounted to the plate (208) without the docking station being present. In this example, any input/output/power devices to be communicatively coupled to the computing device (202) may be directly coupled to the computing device (202) via a number of ports formed on the computing device (202).

The harness (206) may include a back portion and a number of shoulder straps such that a user may place it on the user's body to wear the wearable computing system (200). Any number of straps or fasteners may be implemented to secure the harness (206) to a body of a user when the user is using the wearable computing system (200). The harness (206), in an example, may include a head-mounted display strap (208) to, when not in use, hold a head-mounted display (HMD) to the harness (206) when the HMD is not in use. In an example, a first end of the head-mounted display strap (208) may be coupled to a shoulder strap. A second end and an intermediate portion of the head-mounted display strap (208) may include a magnet so that when a portion of the head-mounted display strap (208) is wrapped around the HMD the head-mounted display strap (208) may be secured to itself via the magnets.

The plate (210) of the wearable computing device mount (204) may include a plurality of stanchions (212, 214) that separate the plate (210) of the wearable computing device mount (204) from the harness (206) except at those locations where the stanchions (212, 214) are coupled to the harness (206). The stanchions (212, 214) may elevate the plate (210) a distance from the harness (206) so as to create a space between the harness (206) and the plate (210). As described herein, the computing device (202) may be selectively coupled to the plate (210). During use, the computing device (202) may produce a level of heat that, if not dissipated, may, when coupled directly to a user's back via the harness (206), be uncomfortable to a user. The stanchions (212, 214) may allow for the separation of the harness (206) worn by a user and the plate (210) maintaining the computing device (202). Air passing within this gap may both cool the computing device (202) during use and cool a user's back through the harness (206) when the user is operating the wearable computing system (200).

The stanchions (212, 214) may include a plurality of shoulder stanchions (212) and a plurality of hip stanchions (214). The shoulder stanchions (212) may be coupled to the harness (206) at a location at or near a shoulder location of the harness (206). The shoulder location of the harness (206) may correspond to a shoulder location of a user. The hip stanchions (214) may be coupled to the harness (206) at a location at or near a hip location of the harness (206). The hip location of the harness (206) may correspond to the hip location of the user. With the hip stanchions (214), a relatively larger portion of the weight of the plate (210), docking station, and/or harness (206) may be placed on the user's hip thereby placing a significant portion of weight of the wearable computing system (200) on a portion of the user's body that may be relatively more comfortable to the user.

The docking station may be coupled to the plate (210) to as to interface with the computing device (202) when the computing device (202) is installed to the plate (210). As described herein, the docking station may provide a single interface with the computing device (202) as well as provide for a plurality of ports with a plurality of user input devices. This may allow the docking station to serve as a single point of connection to the user input devices without having to be consistently connected to the computing device (202) every time the computing device (202) is coupled to the plate (210). This provides a level of convenience to the user.

The wearable computing system (200) may further include a number of battery pack retainers. The battery pack retainers may receive a number of battery packs and provide electrical connection to the docking station and/or computing device (202) so that the battery packs may provide power to the computing device (202) when the computing device (202) is coupled to the plate (210). In an example, the battery pack retainers may be placed on a hip portion of the harness (206). Placement of the battery pack retainers may place the weight of the battery pack retainers and, eventually, the battery packs onto the hips of the user so as to reduce the weight of the wearable computing system (200) on portions of the user's body that may be discomforted by excessive weight.

The battery pack retainers may be made of a rigid material such as plastic and may include any physical interface that retains the battery packs at an electrical interface formed in the battery pack retainers. The battery pack retainers may also include, in an example, a number of mechanical fasteners that help to retain the battery packs therein in order to prevent accidental decoupling of the battery packs from the battery pack retainers. A switch or button may selectively release the battery packs from the battery pack retainers when the battery packs are to be removed. In this example, the button is placed so as to allow a user to actuate the button while the battery pack is maintained in a palm portion of the user's hand. This may allow a user to hold the battery pack while removing it from the battery pack retainer. Because the battery packs may be heavy, having control in this manner may prevent damage to the battery pack or personal injury to the user from accidental droppings.

In an example, the battery pack retainers may provide for the hot-swap ability of the battery packs during use of the wearable computing system (200). Indeed, a plurality of battery pack retainers and associated battery packs may be used so that power may be maintained to the computing device via a single battery pack when another battery pack is being replaced. To facilitate the user, the battery pack retainers may include a battery pack power level indicator that notifies the user of the power levels of the battery packs being used.

As described herein, the battery pack retainers and the battery packs may be maintained on a hip portion of the harness (206). Because the battery packs may have a significant weight associated with them, the weight of the battery packs and battery pack retainers may be born on the user's hips where that weight may be better born. This may render the wearable computing system (200) relatively more comfortable as compared to the battery packs being placed on other parts of the harness (206). Still further, by placing the battery packs and battery pack retainers on the hip portion of the harness (206), a user, during use of the wearable computing system (200), may swap out the battery packs relatively easily. In this example, a user may press the switch or button on the battery pack retainer releasing the battery pack. Because the battery packs are hot-swappable, a disruption in the user's engagement with the enhanced reality being presented via the HMD may be limited. Indeed, a user will not have to remove the entire harness (206) in order to access and swap the battery packs.

Figure 3:
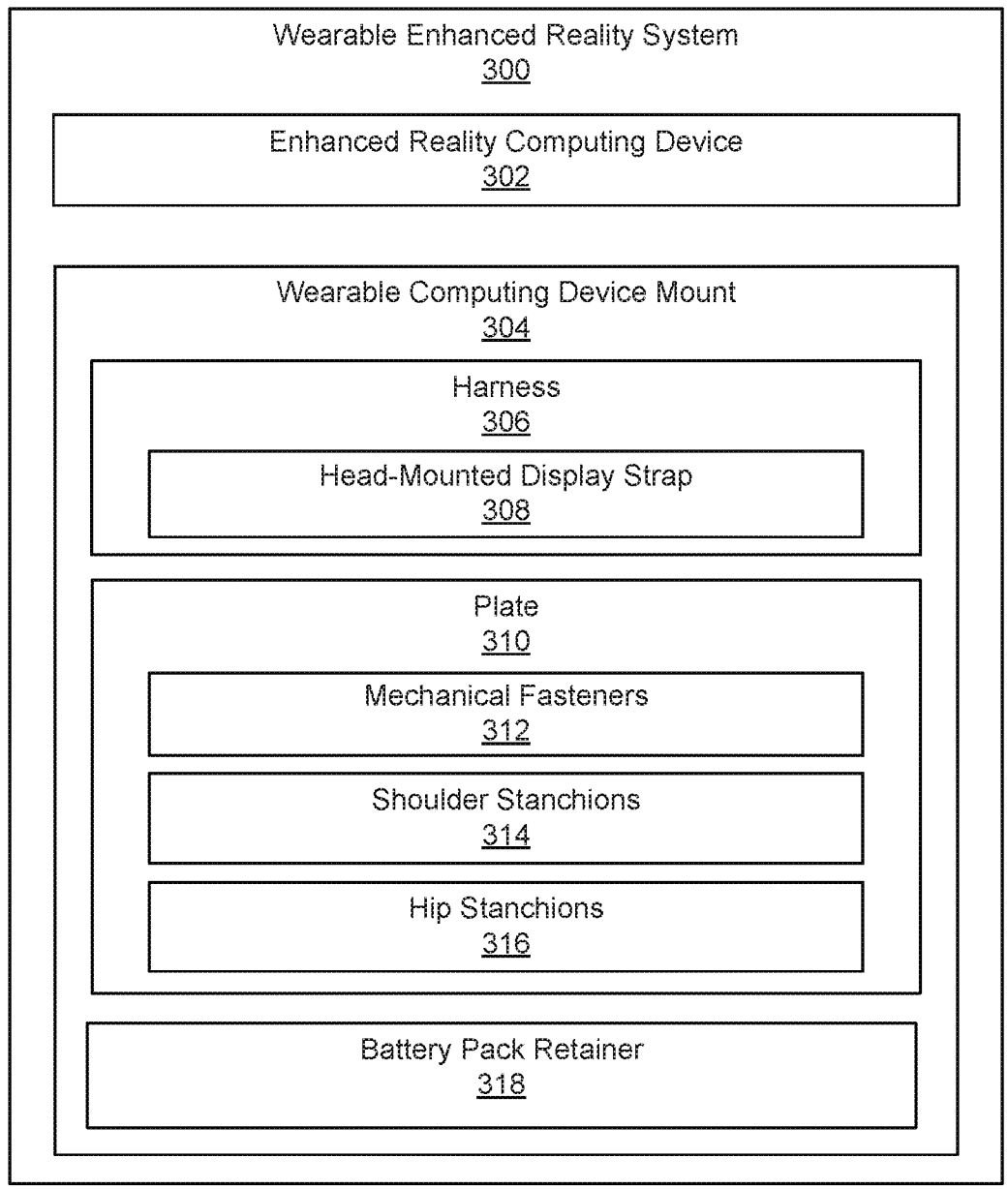
FIG. 3 is a block diagram of a wearable enhanced reality system according to an example of the principles described herein.

FIG. 3 is a block diagram of a wearable enhanced reality system (300) according to an example of the principles described herein. The wearable enhanced reality system (300) may include an enhanced reality computing device (302) and a wearable computing device mount (304). The enhanced reality computing device (302) may include a processor or any type of processing device that receives, from a memory device for example, computer readable program code. The computer readable program code may, when executed by a processor, present an enhanced reality experience to a user via a number of output devices such as an HMD. The user may interact within the enhanced reality environment using the user input devices as described herein.

The wearable computing device mount (304) may include a harness (306), a plate (310), a docking station, and a battery pack retainer. The harness (306) may include a head-mounted display strap (308). As described herein the head-mounted display strap (308) of the harness (306) may hold a head-mounted display (HMD) to the harness (306). In an example, a first end of the head-mounted display strap (308) may be coupled to a shoulder strap of the harness (306). A second end and an intermediate portion of the head-mounted display strap (308) may include a magnet so that when a portion of the head-mounted display strap (308) is wrapped around the HMD the head-mounted display strap (308) may be secured to itself via the magnets. The head-mounted display strap (308) may be provided in order to facilitate the donning and removal of the harness (306) by the user without the aid of a table and/or other user. In particular, the head-mounted display strap (308) may secure the HMD to the harness (306) while the user is taking off or putting on the harness (306) so that others, in order to prevent damage to the HMD, do not hold the HMD during this process. Additionally, by securing the HMD with the head-mounted display strap (308) allows a user to use both hands to remove or put on the harness (306) which can be relatively heavy. This will prevent damage to the computing device, HMD, battery packs, and any other input/output devices due to accidental drops of the harness (306).

The plate (310) may include a number of should stanchions (314) and hip stanchions (316). As described herein, the stanchions (314, 316) cause the plate (310) to be separated from the harness (306) so as to not retain heat from the enhanced reality computing device (302).

The plate (310) may include, in an example, mechanical fasteners (312) to selectively secure the enhanced reality computing device (302) to the plate (310). The mechanical fasteners (312) may take any form. For example, the mechanical fasteners (312) may be interlocking slides that interface with slots on the wearable computing device mount (304). Along with the mechanical fasteners (312), in an example, the plate (310) may include a release switch to release the mechanical fasteners (312) from the enhanced reality computing device (302). A user may then be able to switch out enhanced reality computing devices (302) to and from the plate (310) by activating this switch.

As described herein, the docking station may include a computing device port and an auxiliary port or ports. The auxiliary port allows for auxiliary components to be attached to a docking station. That is, when an enhanced reality computing device (302) is inserted in the docking station and coupled to the plate (310), the auxiliary components are electrically connected to the enhanced reality computing device (302). In other words, the docking station routes electrical signals from auxiliary components attached to the auxiliary ports to the enhanced reality computing device (302) attached to the wearable computing device mount (304).

The auxiliary ports may include any number and variety of connections. The auxiliary ports may include ports that are unique to particular auxiliary components. For example, a battery port may be unique to a particular type of battery that provides power to the enhanced reality computing device (302). Another example of an auxiliary port that may be unique to the auxiliary component is a cable port to provide power from the enhanced reality computing device (302) to an HMD. Other examples of auxiliary ports that may be unique to an auxiliary component include an enhanced reality controller port and a data port for the HMD. In other examples, the auxiliary ports may be usable by a number of auxiliary components. Examples of these multi-device ports include a universal serial bus (USB) port and a high-definition multimedia interface (HMDI) port. In some examples, an auxiliary port includes a cable integrally formed with the docking station. In this example, the free-end of the cable may be plugged in directly to the auxiliary component.

The docking station may include a computing device port. The computing device port may receive and retain the enhanced reality computing device (302). Specifically, the computing device port includes a recess into which an electrical connector of the enhanced reality computing device (302) is inserted. Upon insertion, the electrical connector of the enhanced reality computing device (302) aligns with an electrical interface of the docking station. That electrical interface includes electrical leads routing data and/or power to the various auxiliary ports. The computing device port may include locating pins or interlocking slides to align the enhanced reality computing device (302) to the docking station. For example, the locating pins may be protrusions that are inserted into corresponding recesses in a housing of the enhanced reality computing device (302).

The computing device port may also include retainers such as clips or hooks that interface with the enhanced reality computing device (302) to ensure the electrical interface and electrical connector remain in contact during use. As described herein, the ejection device, upon activation, may disengage these retainers such that the enhanced reality computing device (302) may be removed from the docking station and/or plate (310).

Figure 4:
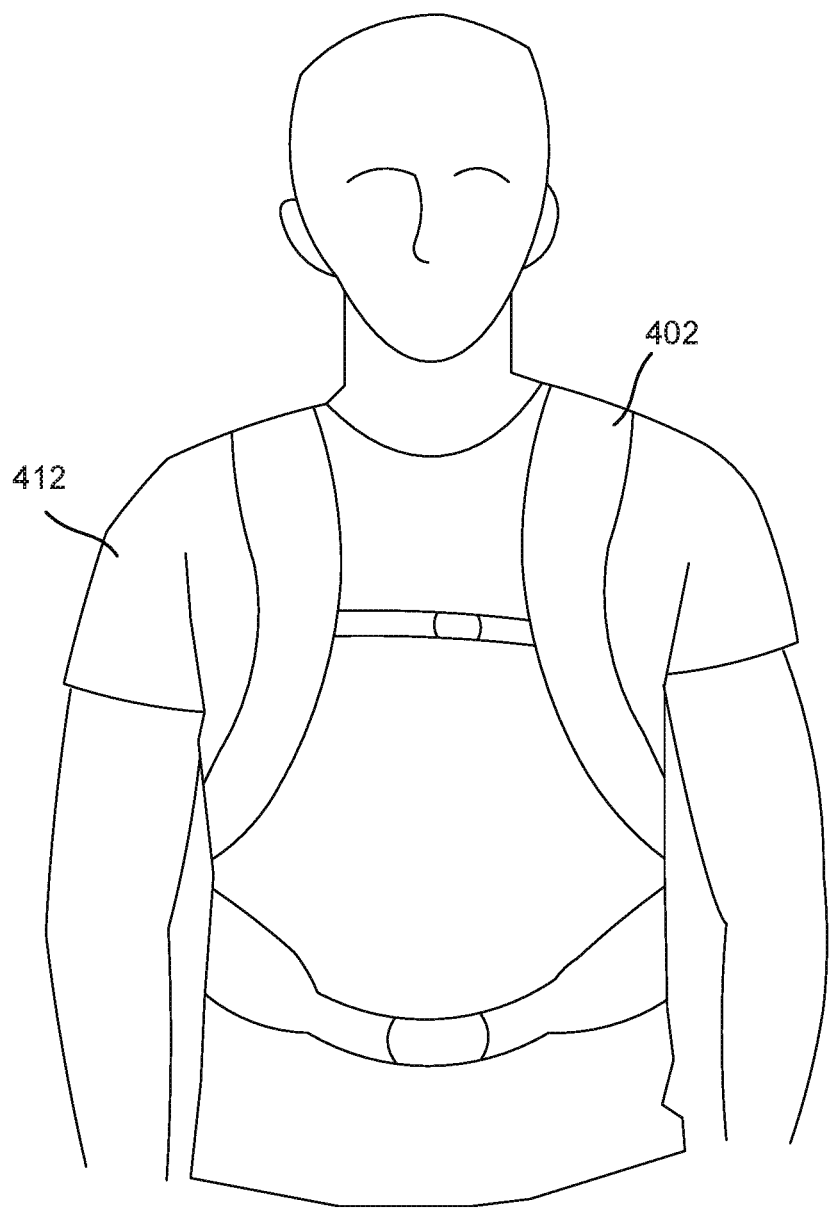
FIG. 4 is a front view of a user wearing the wearable computing device mount according to an example of the principles described herein.

FIG. 4 is a front view of a user (412) wearing the wearable computing device mount (FIG. 2, 204) according to an example of the principles described herein. As described above, the wearable computing device mount (FIG. 2, 204) includes a harness (402) wearable by a user (412). Specifically, the harness (402) positions the plate (FIG. 3, 310) on a back of the user (412). Accordingly, the harness (402) may include shoulder straps to be placed on the shoulders of a user (412). A number of straps across the front of the user (412) secure the harness (402), and corresponding plate (FIG. 3, 310) and computing device, in place such that they do not fall off the user (412), which may potentially damage the computing device. Such shoulder straps and front straps may be formed of any material including nylon and may include padding for the comfort of the user (402). The harness (402) may be adjustable such that it can accommodate various shapes and sizes of users (412).

Figure 5:
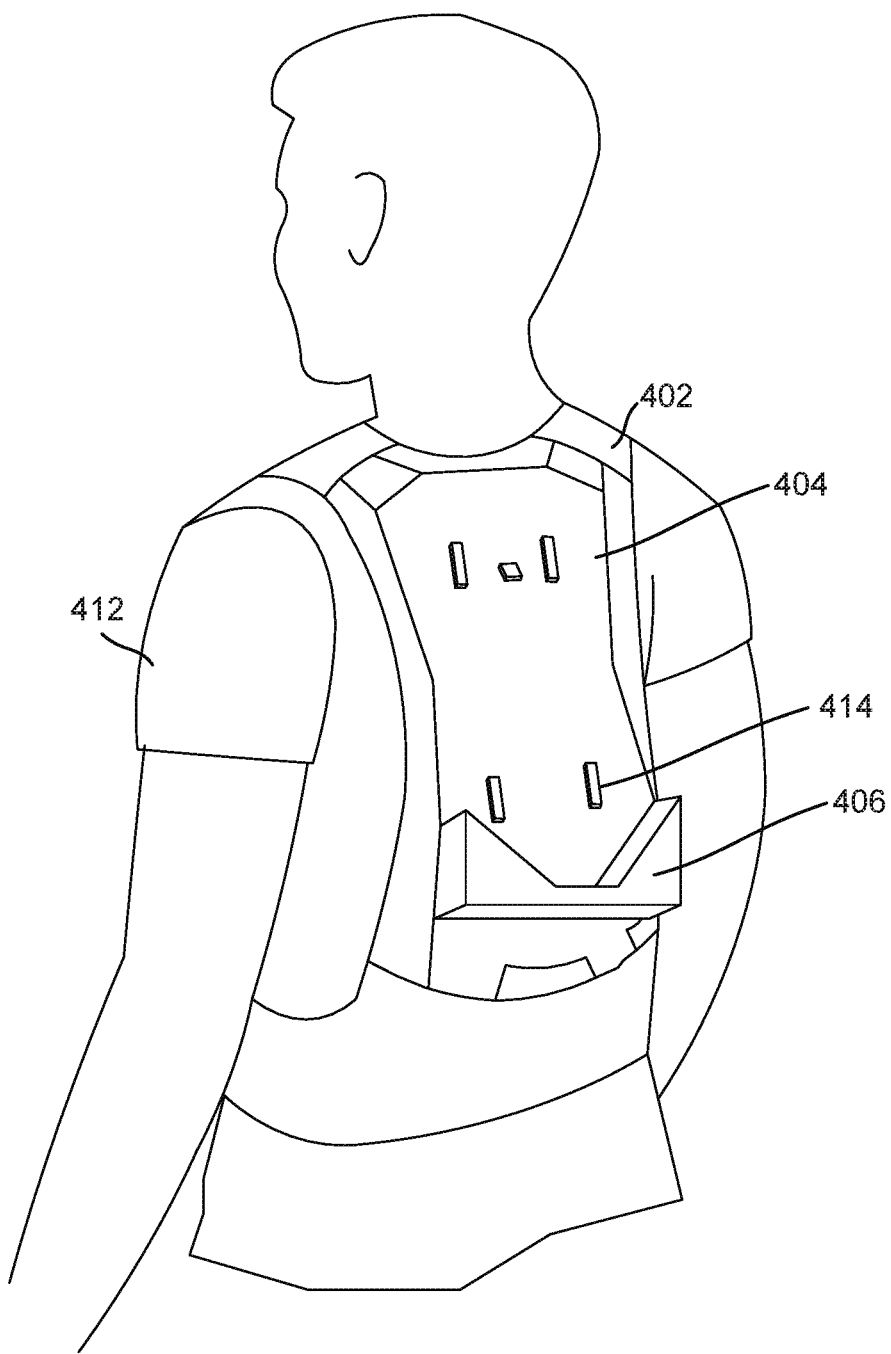
FIG. 5 is a back view of a user wearing the wearable computing device mount according to an example of the principles described herein.

FIG. 5 is a back view of a user (412) wearing the wearable computing device mount according to an example of the principles described herein. As described above, the wearable computing device mount includes a harness (402) to be worn by the user (412). A plate (404) is attached to the harness (402). The harness (402) positions the plate (404), and the enhanced reality computing device (FIG. 3, 302) when affixed, on the back of the user (412). The plate (404) may be formed of a rigid material to support the enhanced reality computing device (FIG. 3, 302). The plate (404) also includes a number of mechanical fasteners (414) disposed thereon to mechanically retain the enhanced reality computing device (FIG. 3, 302) to the plate (404) and harness (402). For simplicity in FIG. 5, just one of the mechanical fasteners (414) is indicated with a reference number. The mechanical fasteners (414) may take any form. For example, the mechanical fasteners (414) may be interlocking slides that interface with slots on the enhanced reality computing device (FIG. 3, 302). While FIG. 5 depicts a particular orientation and configuration of mechanical fasteners (414), different orientations, configurations, and types of mechanical fasteners (414) may be used.

As described herein, the wearable computing device mount may include a docking station (406) according to an example. In this example, the docking station (406) may simplify electrical connection of an enhanced reality computing device (FIG. 3, 302) and auxiliary components. That is, rather than having to connect each individual auxiliary component to the enhanced reality computing device (FIG. 3, 302), the auxiliary components can be attached to, and left attached to, the docking station (406). Then, when a user (412) uses the wearable computing device mount, the enhanced reality computing device (FIG. 3, 302) is inserted to engage with the docking station (406). This engagement couples each auxiliary component to the enhanced reality computing device (FIG. 3, 302). Accordingly, for each use, rather than attaching multiple electrical connections, a single computing device-to-docking station (406) connection is made. The docking station (406) may be formed of any material including plastic and in some cases is selectively removable from the plate (404). That is, the docking station (406) may be removed from the harness (402). In other examples, the docking station (406) may be integrally formed with the plate (404). Doing so may reduce the complexity and weight of the wearable computing device mount. Although FIGS. 5-8 show that the wearable computing device mount (FIG. 2, 204) includes a docking station (406), the present specification also contemplates a wearable computing device mount (FIG. 2, 204) that does not include the docking station. In this example, the computing device computing device (FIG. 3, 302) may be coupled to the plate (404) and any auxiliary input/output/power devices may be directly coupled to the computing device (FIG. 3, 302).

As can be seen in FIG. 5, in some examples, the docking station (406) is disposed below the plate (404). However, other orientations are possible, for example with the docking station (406) disposed on a side of the plate (404).

Figure 6:
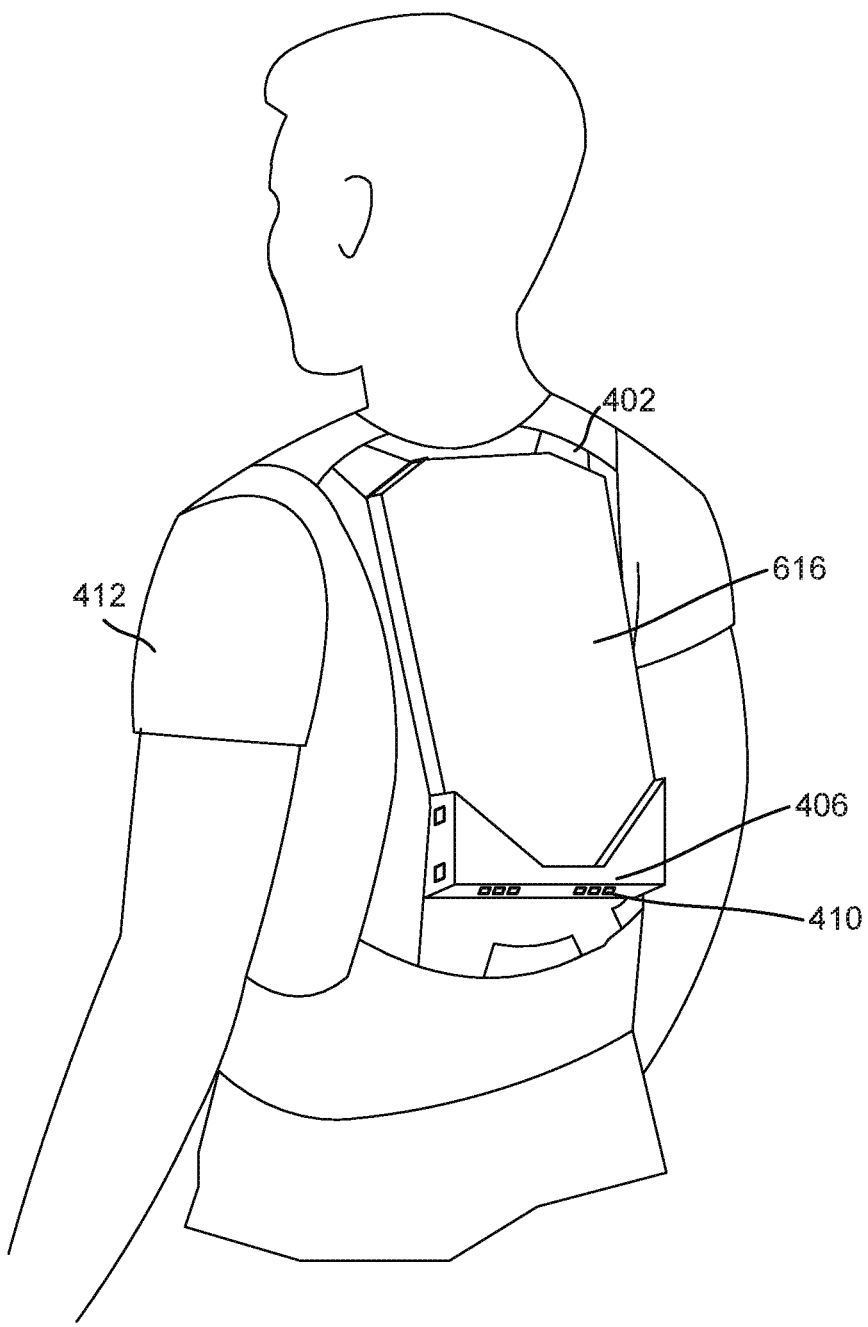
FIG. 6 is a back view of a user wearing the wearable computing device mount with a computing device inserted therein according to an example of the principles described herein.

FIG. 6 is a back view of a user (412) wearing the wearable computing device mount with an enhanced reality computing device (616) inserted or docked therein according to an example of the principles described herein. To achieve its desired functionality, the enhanced reality computing device (616) may include various hardware components. Specifically, the enhanced reality computing device (616) may include various hardware components to generate an enhanced reality environment.

Among these hardware components may be a number of processors which may include graphics processors, a number of data storage devices, a number of peripheral device adapters and a number of network adapters. These hardware components may be interconnected through the use of a number of busses and/or network connections. In one example, the processor, data storage device, peripheral device adapters, and a network adapter may be communicatively coupled via a bus.

The processor may include the hardware architecture to retrieve executable code from the data storage device and execute the executable code. The executable code may, when executed by the processor, cause the processor to implement at least the functionality of creating and interacting with an enhanced environment. In the course of executing code, the processor may receive input from and provide output to a number of the remaining hardware units.

The data storage device may store data such as executable program code that is executed by the processor or other processing device. As will be discussed, the data storage device may specifically store computer code representing a number of applications that the processor executes to implement at least the functionality described herein.

The data storage device may include various types of memory modules, including volatile and nonvolatile memory. For example, the data storage device of the present examples may include Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor may boot from Read Only Memory (ROM), maintain nonvolatile storage in the Hard Disk Drive (HDD) memory, and execute program code stored in Random Access Memory (RAM).

The data storage device may include a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain or store a program for use by or in connection with an instruction execution system, apparatus, or device.

The hardware adapters in the enhanced reality computing device (616) enable the processor to interface with various other hardware elements, external and internal to the enhanced reality computing device (616). For example, the peripheral device adapters may provide an interface to input/output devices, such as, for example, enhanced reality display devices and enhanced reality controllers. The peripheral device adapters may also provide access to other external devices such as an external storage device.

As described herein, the enhanced reality computing device (616) includes components that interface with the mechanical fasteners (414), such that the enhanced reality computing device (616) is securely coupled to the plate (404).

As depicted in FIG. 6, the docking station (406) may include multiple auxiliary ports (410). For simplicity in FIG. 6, just one auxiliary port (410) is indicated with a reference number. The auxiliary ports (410) allow auxiliary components to be attached to a docking station (406). That is, when an enhanced reality computing device (616) is inserted in the docking station (406), the auxiliary components are electrically connected to the enhanced reality computing device (616). In other words, the docking station (406) routes electrical signals from auxiliary components attached to the auxiliary ports (410) to the enhanced reality computing device (616) attached to the computing device port (FIG. 3, 320).

The auxiliary ports (410) may include any number and variety of connections. The auxiliary ports (410) may include ports that are unique to particular auxiliary components. For example, an input battery port may be unique to a particular type of battery that provides power to the enhanced reality computing device (616). Another example of an auxiliary port (410) that may be unique to the auxiliary component is a cable port to provide power from the enhanced reality computing device (616) to an HMD. Other examples of auxiliary ports (410) that may be unique to an auxiliary component include an enhanced reality controller port and a data port for the HMD.

In other examples, the auxiliary ports (410) may be usable by a number of auxiliary components. Examples of these multi-device ports include a universal serial bus (USB) port and a high-definition multimedia interface (HMDI) port. While FIG. 6 depicts a certain number and orientation of auxiliary ports (410) and while a few specific examples of types of auxiliary ports (410) have been provided, any number, orientation, and type of auxiliary port (410) may be used.

In some examples, an auxiliary port (410) includes a cable integrally formed with the docking station (406). In this example, the free-end of the cable may be plugged in directly to the auxiliary component.

Figure 7:
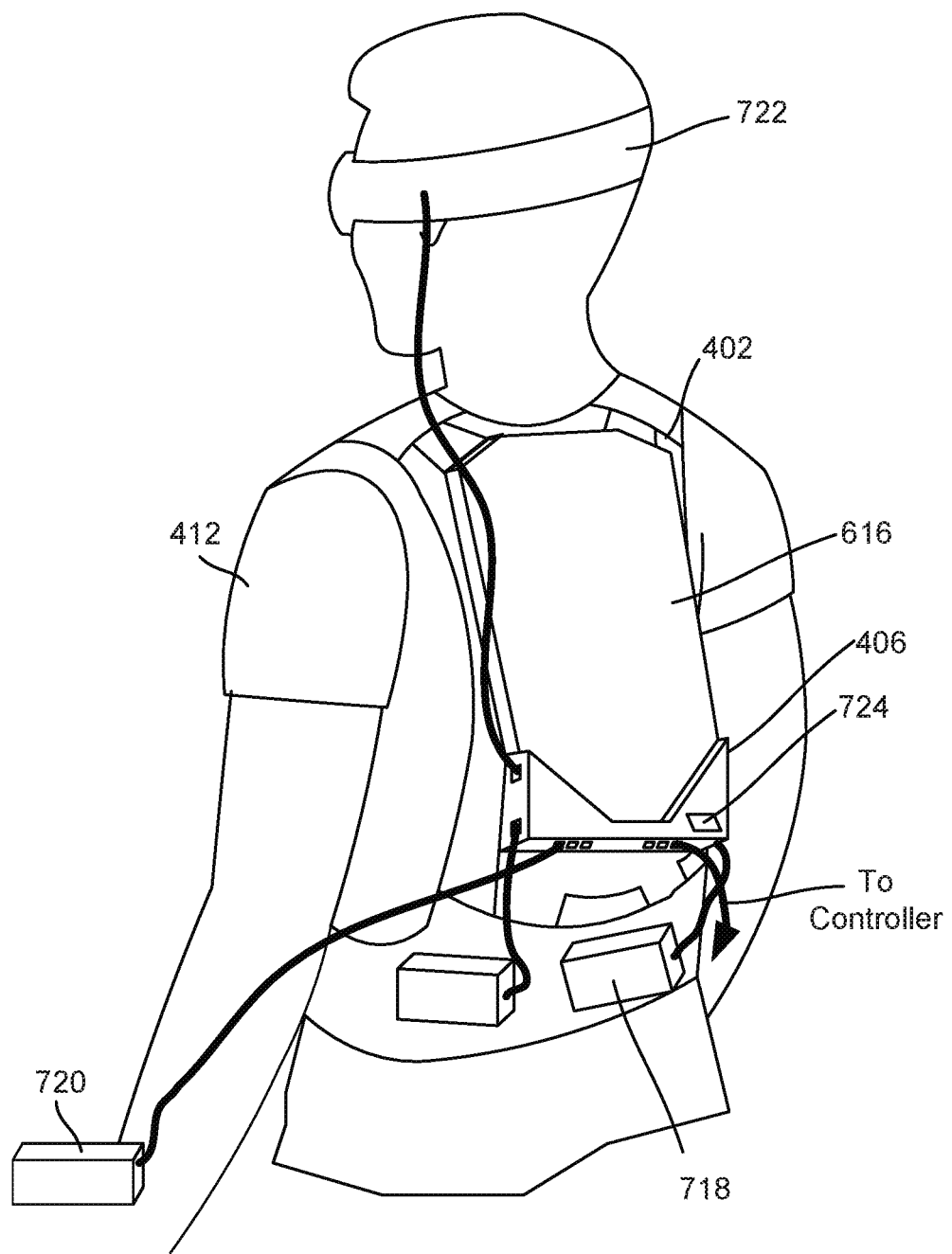
FIG. 7 is a back view of a user wearing the wearable enhanced reality system according to an example of the principles described herein.

FIG. 7 is a back view of a user (412) wearing the wearable enhanced reality system according to an example of the principles described herein. The wearable enhanced reality system includes the wearable computing device mount (FIG. 1, 100) which includes the harness (402), plate (not shown), and docking station (406). The system also includes the enhanced reality computing device (616) which may generate the visual, auditory, and other sensory environments, detects user input, and manipulates the environments based on user input.

In this example, the wearable enhanced reality system also includes a number of auxiliary components which are connected via cables. For example, the enhanced reality system, may include a head-mounted enhanced reality display (722) to be worn by the user (412). The head-mounted enhanced reality display (722) may be communicatively coupled to the enhanced reality computing device (616) such that execution of computer readable program code by a processor associated with the enhanced reality computing device (616) causes a view of an enhanced reality environment to be displayed in the head-mounted enhanced reality display (722). In this example, the head-mounted enhanced reality display (722) implements a stereoscopic head-mounted display that provides separate images for each eye of the user. In some examples, the head-mounted enhanced reality display (722) may provide stereo sound to the user. In an example, the head-mounted enhanced reality display (722) may include a head motion tracking sensor that includes a gyroscope and/or an accelerometer. The head-mounted enhanced reality display (722) may also include an eye tracking sensor to track the eye movement of the user of the head-mounted enhanced reality display (722).

Another auxiliary component is an enhanced reality computing device (616) power supply (718). FIG. 7 depicts one power supply (718) with a reference number; however, any number of power supplies (718) may be present. In this example, the power supplies (718) are coupled to the docking station (406) via a multi-use, or unique, auxiliary connection and provide power to the enhanced reality computing device (616). That power is used to 1) generate the enhanced reality environment and 2) to provide power to other components such as the head-mounted enhanced reality display (722). An example of another auxiliary component is an enhanced reality controller (720) which may be held by the user (412) and used to interact with and manipulate objects in the enhanced environment. While FIG. 7 depicts one controller (820), another controller (not shown) may also receive power from and transmit data with the computing device (616) via the docking station (406).

Each of these auxiliary components may be coupled to the docking station (406) such that upon insertion of the computing device (616), data and power transfer are enabled to and from the different components. To use the enhanced reality computing device (616), a user (412) may insert the enhanced reality computing device (616) into, and establish a connection with, the docking station (406) that forms all the electrical connections. This allows a user (412) to use the enhanced reality system by making a single connection, i.e., enhanced reality computing device (616) to docking station (406), rather than making multiple connections between the enhanced reality computing device (616) and each auxiliary component.

In some examples, the auxiliary components may be attached to the harness (402) via quick release connections. For example, the head-mounted enhanced reality display (722) may include a cable that attaches to a cable on the shoulder strap so that it can be quickly attached and removed. In this example, the cable on the shoulder strap may remain attached to the docking station (406). Doing so simplifies putting the harness (402) on as a user puts the harness (402) on without the head-mounted enhanced reality display (722) attached to it, which may potentially result in the head-mounted enhanced reality display (722) being dropped on the ground. In an example, a strap may be used to selectively hold the head-mounted display (HMD) to the harness (402) as described herein.

As yet another example, the enhanced reality controllers (720) may include cables that attach to a cable on the waist strap so that they can be quickly attached and removed. In this example, the cable on the waist strap may remain attached to the docking station (406). Doing so simplifies putting the harness (402) on as a user puts the harness (402) on without the enhanced reality controllers (720) attached to it, which may potentially result in the enhanced reality controllers (720) being dropped on the ground.

Similarly, there may be docks for the enhanced reality computing device (616) power supplies (718) that allow them to be quickly attached and removed. The cables from the docks to the docking station (406) may remain attached. In each of these examples, the enhanced reality computing device (616) can be quickly attached and removed from the docking station (406) while the harness (402) is not being worn. The auxiliary components can be quickly attached to the harness (402) while the harness (402) is being worn without having to reach the docking station (406) or enhanced reality computing device (616).

In some examples, data and power transfer may be facilitated even when the enhanced reality computing device (616) is not installed. For example, the docking station (406) could be connected to a separate power supply and would then transfer that power to the power supplies (718), i.e., batteries, to charge them, even when the enhanced reality computing device (616) is not installed. It may also be desirable to drive power to various accessories, such as a wireless network card, powered USB ports, or global positioning systems among others. The docking station (406) itself may also be supplied with power, for example to perform updates received over the wireless network, even when an enhanced reality computing device (616) is not present. As yet another example, a user (412) may desire to charge controllers (720).

As described herein, the mechanical fasteners (414) provide a physical coupling of the enhanced reality computing device (616) to the plate (404) and docking station (406). In some examples, a retainer of the docking station (406) may also provide this function. That is, a retainer of the docking station (406) may retain the enhanced reality computing device (616) in electrical connection with the docking station (406). In this example, the docking station (406) may include an ejection device, such as a mechanical release that disengages the retainer such that the enhanced reality computing device (616) can be removed from the wearable computing device mount (FIG. 1, 100).

Figure 8:
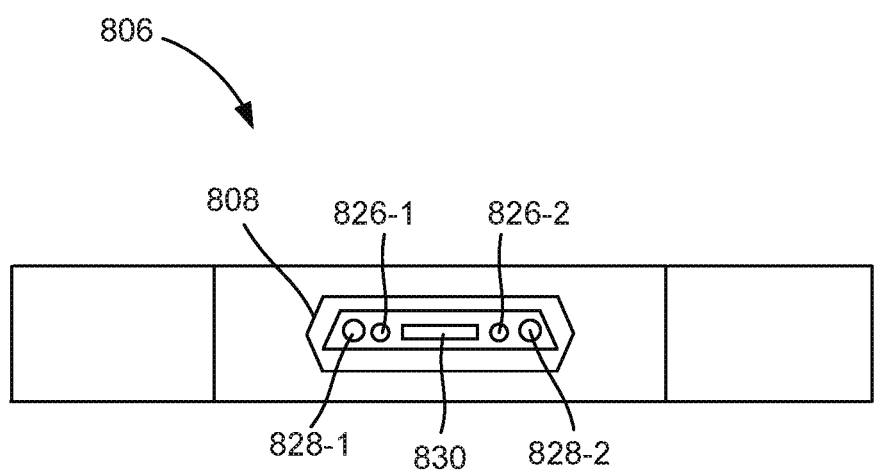
FIG. 8 is a top view of the electrical connector of the wearable computing device mount according to an example of the principles described herein.

FIG. 8 is a top view of the docking station (806) of the wearable computing device mount (FIG. 1, 100) according to an example of the principles described herein. As described herein, the docking station (806) includes a computing device port (808) that receives and retains the enhanced reality computing device (616). Specifically, the computing device port (808) includes a recess into which an electrical connector of the enhanced reality computing device (616) is inserted. Upon insertion, the electrical connector of the enhanced reality computing device (616) aligns with an electrical interface (830) of the docking station (806). That electrical interface (830) includes electrical leads routing data and/or power to the various auxiliary ports. The computing device port (808) may include locating pins (826-1, 826-2) or interlocking slides to align the enhanced reality computing device (616) to the docking station (806). For example, the locating pins (826) may be protrusions that are inserted into corresponding recesses in the housing of the enhanced reality computing device (616).

The computing device port (808) may also include retainers (828-1, 828-2) such as clips, or hooks that interface with the enhanced reality computing device (616) to ensure the electrical interface (830) and electrical connector remain in contact during use. As described above, the ejection device upon activation may disengage these retainers (828-1, 828-2) such that the enhanced reality computing device (616) may be removed.

Figure 9:
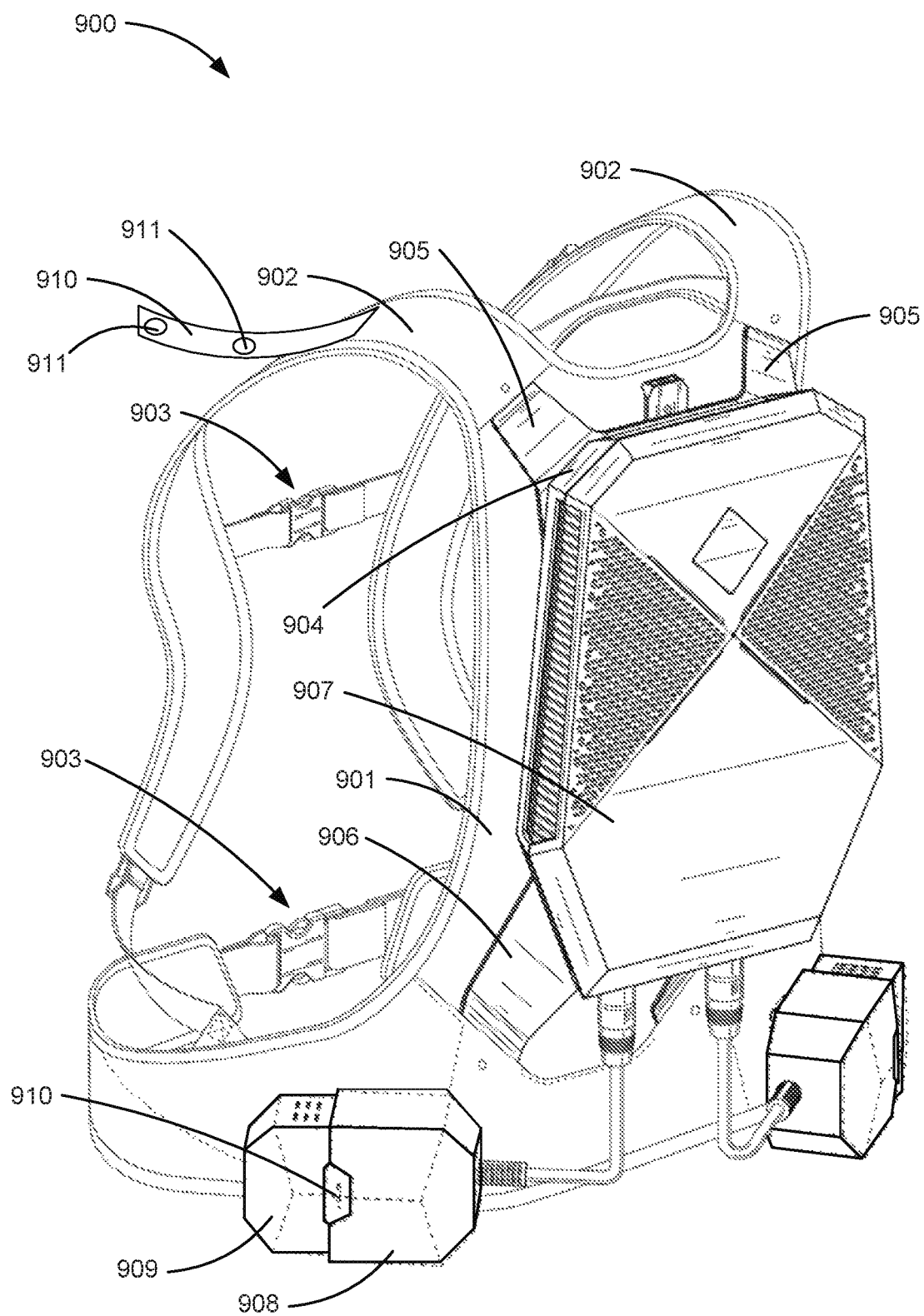
FIG. 9 is a back, perspective view of a wearable computing system according to an example presented herein.
Figure 10:
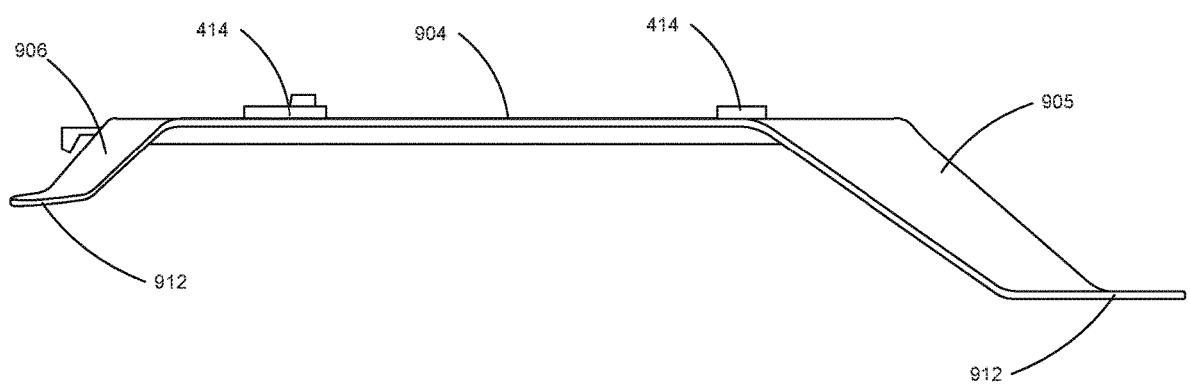
FIG. 10 is a side view of a plate according to an example of the principles described herein.
Figure 11:
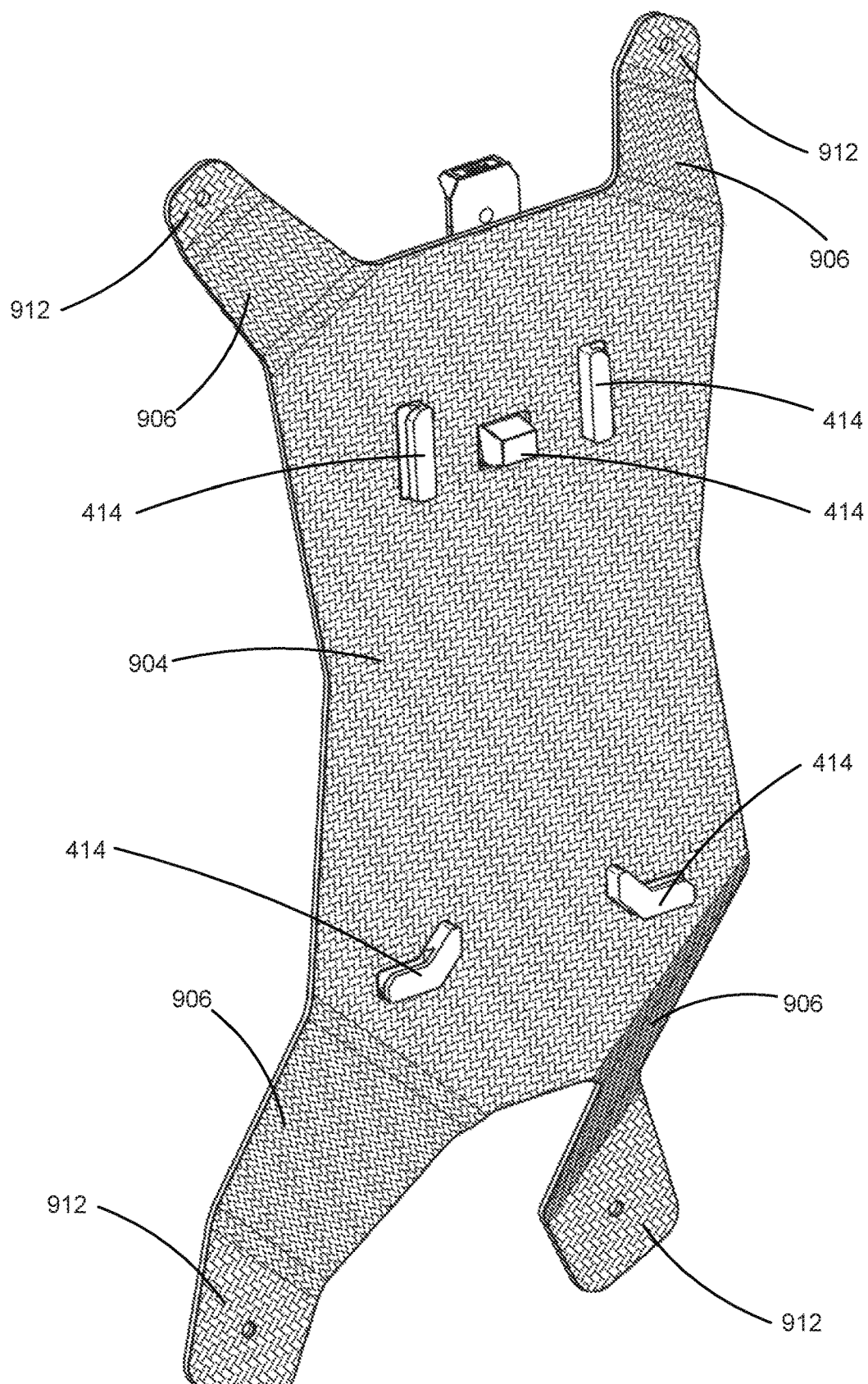
FIG. 11 is a perspective view of a plate according to an example of the principles described herein.

FIG. 9 is a back, perspective view of a wearable computing system (900) according to an example presented herein. FIG. 10 is a side view of a plate (904) according to an example of the principles described herein. FIG. 11 is a perspective view of a plate according to an example of the principles described herein. The wearable computing system (900) may include a harness (901) having straps (902) and buckles (903) to secure the harness (901) to the body of a user. The wearable computing system (900) may include a plate (904) that includes a number of stanchions (905, 906) that offset the plate (904) from the harness (901): shoulder stanchions (905) and hip stanchions (906).

As described herein, the plate (904) may interface with a computing device (907). The interface between the plate (904) and computing device (907) may include any selectively coupling device that allows a user to place the computing device (907) and remove the computing device (907) from the plate (904).

The harness (901) may further include a battery pack retainer (908) to hold a battery pack (909). The battery pack (909) may provide power to the computing device (907) as described herein. The battery pack retainer (908) may be coupled to a hip portion of the harness (901) so as to place the weight of the battery pack retainer (908) and battery pack (909) on a user's hips that, compared to other portions of the user's body, may take additional weight as compared to other parts of a user's body.

The harness (901) may include a head-mounted display strap (910). The head-mounted display strap (910) may include a magnet (911) placed at a terminal end of the head-mounted display strap (910) and at an intermediate portion of the head-mounted display strap (910). When the HMD is not in use by the user, a portion of the head-mounted display strap (910) may be wrapped around the HMD so that the magnets (911) placed on the head-mounted display strap (910) may be coupled together using magnetic force thereby maintaining the HMD with the harness (901).

As described herein, the hip stanchions (906) and shoulder stanchions (905) may raise the plate (904) away from the harness (901) so as to create a gap between the harness (901) and the plate (904). The angle of the hip stanchions (906) and/or shoulder stanchions (905) relative to the plate (904) as well as the length of the stanchions (904, 905) may vary based on how far the plate (904) is to be from the harness (901). The hip stanchions (906) and shoulder stanchions (905) may include feet (912). The feet (912) may provide a surface that is relatively parallel to the surface of the harness (901) and/or a user's body. The feet (912) may also serve as a surface through which a number of fasteners may be passed in order to secure the feet (912), stanchions (905, 906), and plate (904) may be fixed to the harness (901).

Using such a wearable computing device mount 1) improves immersion in the enhanced environment by allowing unimpeded movement of a user while interacting with the enhanced environment, 2) enhances the efficiency of use of an enhanced reality system by reducing the time between content creation and content viewing; and 3) simplifies the setup for the enhanced reality system. However, it is contemplated that the devices disclosed herein may address other matters and deficiencies in a number of technical areas. Additionally, with the plate having stanchions that are coupled to the harness, air may pass between a user/harness and the plate/enhanced reality computing device so as to increase the comfortability of the wearable-computing device. Even further, the battery pack retainers provide power to the enhanced reality computing device while placing an amount of weight on the hips of the user due to the battery pack retainers/battery packs being secured to a hip portion of the harness. Even further, the head-mounted display strap described herein allows for a user to secure the HMD to the harness when not in use. This may provide for relatively easy donning of the harness.

The preceding description has been presented to illustrate and describe examples of the principles described. This description is not intended to be exhaustive or to limit these principles to any precise form disclosed. Many modifications and variations are possible in light of the above teaching.

What is claimed is:

1. A wearable computing device mount comprising:
a harness wearable by a user;
a plate attached to the harness, the plate including a plurality of stanchions that raises a back side of the plate a distance away from the harness to form a space between the back side of the plate and the harness, wherein a computing device is selectively mountable to the plate via mechanical fasteners and selectively removeable from the plate; and a latch to release the computing device from the mechanical fasteners of the plate, wherein the harness positions proximal ends of the stanchions on a back of the user when worn and the stanchions include feet that are relatively parallel to the surface of the harness, the stanchions extending at an angle with respect to the feet and the plate.

2. The wearable computing device mount of claim 1, comprising a docking station for electrical connection to the computing device, wherein the docking station is integrally formed with the plate.

3. The wearable computing device mount of claim 2, the docking station comprising an auxiliary port to provide connection between an auxiliary component and the computing device.

4. The wearable computing device mount of claim 2, further comprising pins to align the computing device for electrical connection with the docking station.

5. The wearable computing device mount of claim 1, the computing device and plate comprising a vent system to direct heat away from the harness wearable by the user.

6. The wearable computing device mount of claim 1, further comprising a strap coupled to the harness, the strap to selectively secure a head-mountable display (HMD) to the harness,
wherein the strap comprises a number of magnets, the strap to wrap around a portion of the HMD to secure the HMD to the harness.

7. The wearable computing device mount of claim 6, wherein the HMD is an enhanced-reality headset connected to the auxiliary port of the docking station.

8. The wearable computing device mount of claim 1, wherein the harness comprises a battery pack retainer to receive a battery pack and electrically couple the battery pack to the computing device.

9. The wearable computing device mount of claim 8, further comprising a charger to provide power from a separate power supply to charge the battery pack receivable by the battery pack retainer.

10. A wearable computing system comprising:
a computing device; and
a wearable computing device mount comprising:
a harness wearable by a user, the harness comprising a head-mountable display (HMD) strap to secure an HMD to the harness; and
a plate attached to the harness, wherein the computing device is selectively mountable to the plate via mechanical fasteners, wherein the plate comprises a plurality of shoulder stanchions and a plurality of hip stanchions to raise the plate a distance away from the harness.

11. The wearable computing system of claim 10, wherein the HMD strap comprises a plurality of magnets to secure the strap around a portion of the HMD.

12. The wearable computing system of claim 10, wherein the mechanical fasteners comprise an interlocking slide to selectively secure the computing device to the plate.

13. The wearable computing system of claim 10, comprising a docking station coupled to the plate comprising a retainer to selectively retain the computing device in a computing device port of the docking station during use.

14. The wearable computing system of claim 13, comprising an ejection device to release the computing device from the retainer.

15. The wearable computing system of claim 10, wherein the plurality of shoulder stanchions and the plurality of hip stanchions include feet that are relatively parallel to the surface of the harness, the plurality of shoulder stanchions and the plurality of hip stanchions extending at an angle with respect to the feet and the plate.

16. A wearable enhanced reality system comprising:
an enhanced reality computing device to generate an enhanced reality environment;
a wearable computing device mount comprising:
a harness wearable by a user comprising a strap to selectively hold a head-mountable display (HMD) to the harness;
a plate attached to the harness, wherein the enhanced reality computing device is selectively mountable to the plate via mechanical fasteners and wherein the plate comprises a plurality of shoulder stanchions and a plurality of hip stanchions to raise the plate a distance away from the harness; and
a battery pack retainer to receive a battery pack and electrically couple the battery pack to the computing device.

17. The wearable enhanced reality system of claim 16, the strap comprising a plurality of magnets to selectively hold the HMD to the harness.

18. The wearable enhanced reality system of claim 16, further comprising a mechanical release to release the enhanced reality computing device from the mechanical fasteners of the plate.

19. The wearable enhanced reality system of claim 16, wherein the plurality of shoulder stanchions and the plurality of hip stanchions include feet that are relatively parallel to the surface of the harness, the plurality of shoulder stanchions and the plurality of hip stanchions extending at an angle with respect to the feet and the plate.

* * * * *